Oct. 14, 1941.    M. WATTER    2,259,279
DOLLY
Filed Feb. 2, 1940    2 Sheets-Sheet 1

INVENTOR
Michael Watter
BY John P. Tarbox
ATTORNEY

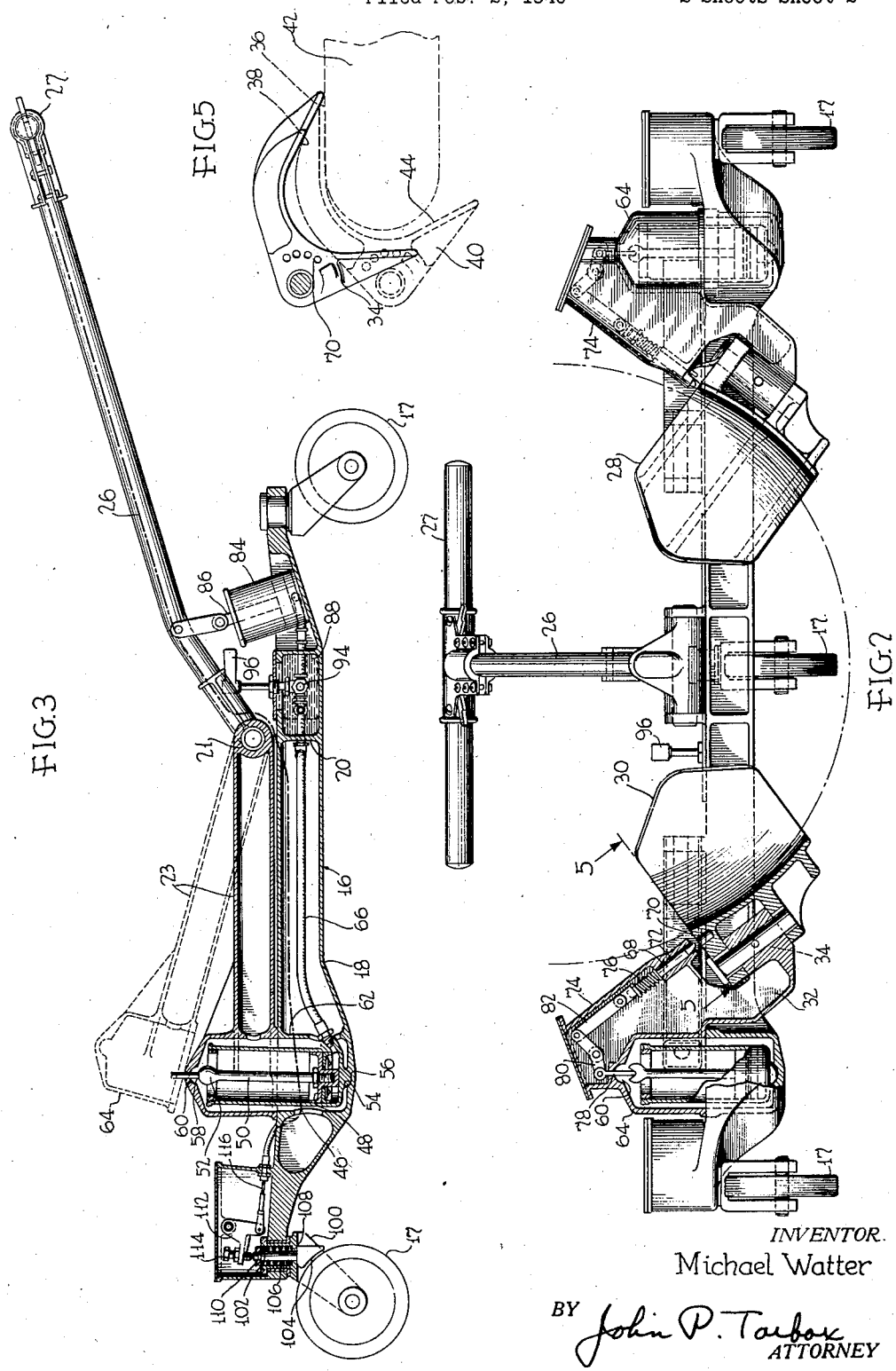

Patented Oct. 14, 1941

2,259,279

UNITED STATES PATENT OFFICE 2,259,279

DOLLY

Michael Watter, Philadelphia, Pa., assignor to Edward G. Budd Manufacturing Company, Philadelphia, Pa., a corporation of Pennsylvania Application February 2, 1940, Serial No. 316,887

14 Claims. (Cl. 254—2)

This invention in general relates to parking devices for vehicles and more particularly to a parking dolly for aircraft, having for its object the provision of a device of the kind indicated embodying certain novel features of design and construction adapted to expedite the parking of aircraft, particularly on aircraft carriers, and to assure the fixing of their position after parking.

Another object is the provision of an aircraft parking dolly having novel self-locking means for operatively engaging and lifting the tire of an aircraft preparatory to moving the craft.

Another object is the provision of an aircraft parking dolly having the combination of novel self-locking tire engaging means and lifting means, both controlled and operated through a single manually-operable means located at a convenient point normally clear of the craft, and adapted to receive various tire sizes with equal ease.

A further object is the provision of improved means for parking aircraft on aircraft carriers and embodied in the form of a compact dolly equipped with automatic tire gripping means, improved lockable casters, and a single manually operable member for energizing the aircraft lifting means and for manipulating the dolly.

A still further object is to provide a tire-engaging aircraft dolly of generally improved design and construction that will be durable and inexpensive in construction, as well as convenient, practical, serviceable and efficient in use.

The handling and parking of the large number of aircraft customarily conveyed by aircraft carriers constitutes one of the most important and arduous functions of these auxiliaries of modern navies.

Since the locating of an aircraft in a given position on an aircraft carrier among a large number of other aircraft thereon is at best a time-consuming and rather tedious task, it will be realized that any means facilitating the parking of the said aircraft and thereby effecting an appreciable saving in time and labor may prove in actual warfare or time of emergency a decisive factor in achieving the objective in view.

The present invention contemplates a dolly of compact design, light but strong construction and capable of convenient manipulation by one operator. Novel means are provided for automatically locking the tire engaging member in operative position by contact with an aircraft tire, and a single means, the steering handle, serves for operating the elevating means or jacks and for manipulating the dolly.

For the purpose of illustrating the invention there is shown one form thereof which is at present preferred since the same has been found to be convenient, practical and serviceable but it is to be understood that the various instrumentalities comprising the invention can be variously arranged and organized and that the invention is not limited to the precise arrangement and organization of the instrumentalities as herein shown and described.

The invention consists in certain novel parts, arrangements and combinations which will be described in connection with the accompanying drawings wherein:

Figure 2 is an end elevation.

Figure 3 is a vertical section of one branch of the dolly platform taken substantially on the line 3—3 of Figure 1.

Figure 5 is a view of a single tire engaging member of Figures 1 and 2 to illustrate the manner of operation and as viewed from a plane 5—5 of Figure 2.

Figure 1:
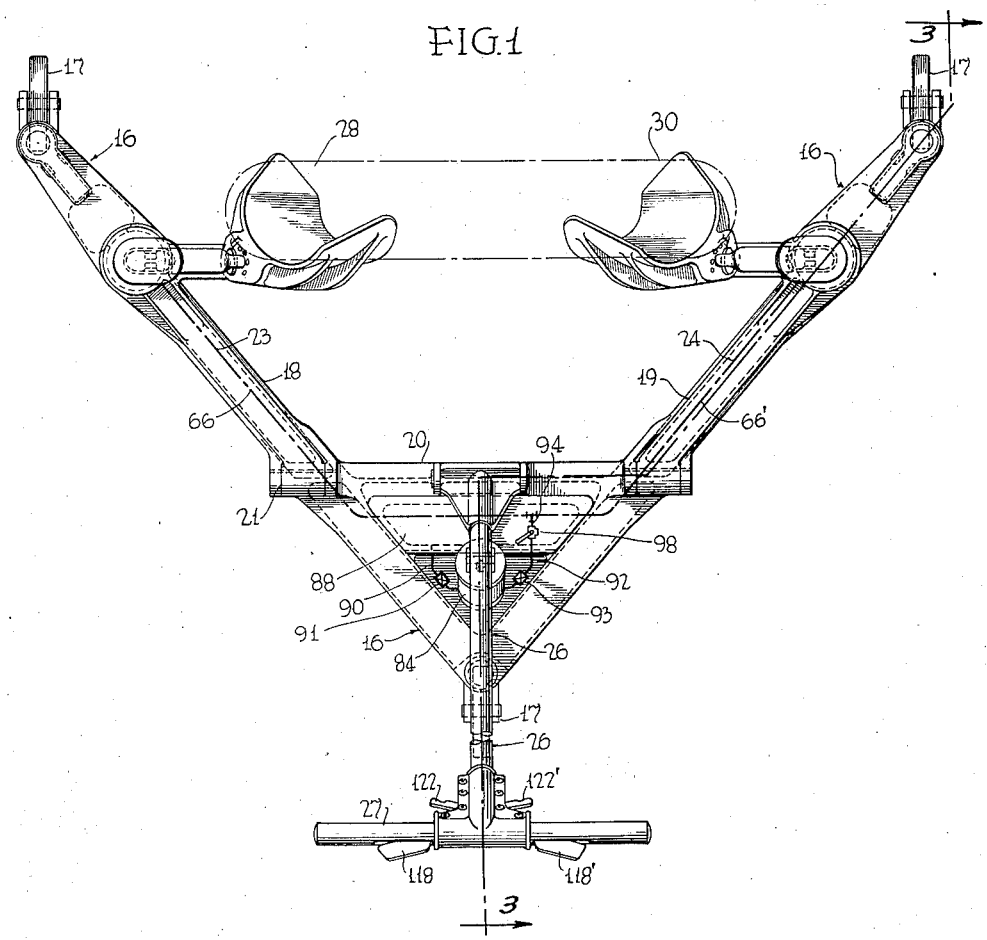
Figure 1 is a top plan view of an embodiment of the invention in a position ready for application to a tire of an airplane wheel.

Referring to the drawings and more particularly Figure 1, there is shown a parking dolly having a V-shaped frame 16 supported at its apex and its extremities upon three swivel caster wheels 17. The V-frame 16 is more specifically composed of arms 18 and 19 together with a transverse brace therebetween close to the apex and indicated generally by the reference numeral 20. Upon each arm 18 and 19 of the frame are pivotally mounted lifting arms 23 and 24 which in released position lie parallel with the arms 18 and 19 and on top thereof. A pivot 21 is provided for these arms located above the transverse member 20, and in line with the pivot is arranged a suitable handle 26 for generally controlling the movements of the dolly, the handle being reciprocable in a vertical plane for reasons which will appear hereinafter.

In order to facilitate engagement of the dolly with a pneumatic tired wheel, such as an aircraft wheel, the arms 23 and 24 at their divergent ends carry a pair of saddle-shaped members 28 and 30 pivotally supported in such a way that, upon engagement with a wheel or tire, they are caused to bind therearound in order to support the same upon the subsequent lifting of the arms 23 and 24 with reference to the main frame 16.

Referring to Figure 2, there will be seen an angularly depending projection 32 forming a rigid part of the arm 23, the same being adapted to pivotally support the tire saddle 28 upon an axis substantially 45 degrees from the vertical as indicated at 34. The saddle is so positioned and so shaped that upon rolling the dolly toward the tire of a wheel (see Figure 5) the wheel will first strike an inwardly extending portion 36 thereof causing the same to swing to a position such that the face 38 of the inwardly extending portion 36 becomes parallel or substantially parallel to the plane of the wheel and a portion 40 caused to swing to such a position as is indicated, such that the tire 42 is embraced between the faces 38 of the portion 36 and the face 44 of the portion 40.

With both saddles in engagement with a tire as hereinabove described, in order to lift the vehicle wheel from the ground to support it on the dolly, it is necessary to raise the pivoted arms 23 and 24 from the V-frame 16. For this purpose a hydraulic cylinder and piston are provided for each arm (see Fig. 3). The cylinder and piston constitute in effect an extensible strut for the purpose of pivoting the arm 23 about the pivot 21 upon the frame 16. For this purpose the fluid pressure motor comprises a cylinder 46 having a piston 48 therein, the latter having a piston rod 50 extending outwardly of the end of the cylinder as at 52. In order that the piston and cylinder may swivel in any necessary direction and act as a free strut, the cylinder head is provided with a spherical end surface 54 nesting in a complementary recess 56 in the arm 18 of the frame 16 and the piston rod is provided with a spherical end surface 58 adapted to ride in a complementary recess 60 in the under-side of the arm 23. In release position the cylinder and piston are housed within recesses 62 and 64 formed integrally in the frame 16 and the pivoted arms 23 and 24.

It will be readily understood that the piston 48 is actuated in the cylinder through hydraulic pressure fed to the same through a flexible conduit 66, the source of which fluid pressure will be hereinafter described in more detail. As has previously been described, the saddle members which are adapted to receive the wheel tire may take any number of positions depending upon the size of the tire which is engaged and in order to fix the saddle against pivotal motion with respect to the depending arm 32 upon which it is pivoted, once it is in proper position for lifting a wheel off the ground, the piston 48 is adapted to actuate a latching mechanism prior to actually raising the arm 23. The latching mechanism comprises a pin 68 adapted to be driven into one or another of a plurality of recesses 70 arranged around an arc concentric with the pivotal axis of the saddle member in the top face thereof. The pin 68 is guided in its movement in a bore 72 located in the housing 74 also forming a part of the depending arm 32 and the housing 74, and a spring 76 normally retracts the pin out of operative relation with the latching apertures 70. Upon initial movement of the piston 48, however, the piston rod 50 is adapted to drive a pin 78 slidably received in an aperture passing through the center of the complemental spherical recess 60 so that the latching pin 68 is driven into operative position through the actuation of a bell crank 80 connected to the pin 78 as well as the latching pin 68 through a link 82. Thus upon forcing the piston upward in the cylinder, the latch pin 68 is forced downward into whichever socket presents itself and from then on the saddle members 28 are fixed against rotation and are caused to rise with the arm 23 in response to further movement of the piston 48.

Fluid pressure is delivered to the cylinders 46 through the flexible conduit 66 from a pump cylinder 84 located at the apex of the frame 16, the pump having a plunger 86 adapted to be reciprocated within the cylinder 84 by a pumping action of the handle 26. As is illustrated in Figure 1, the pump cylinder 84 derives its fluid from a reservoir 88 through a conduit 90 and delivers the fluid to the elevating cylinders 46 through the pipe line 92, three-way valve 94 and branch conduits 66 and 66'. The three-way valve 94 is preferably located within the reservoir 88 with a handle or suitable lever 96 projecting thereabove so that the fluid pressure developed in the elevating cylinders 46 may be relieved by connecting the conduit port 66 with a reservoir return port 98 in the three-way valve from which fluid is released or returned to the reservoir.

Figure 4:
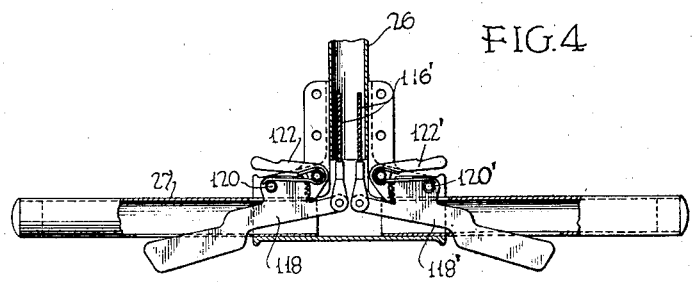
Figure 4 is an enlarged fragmental view partially in section of the control handle.

Since it is essential that such a dolly have some means for arresting its movement, a brake is provided in conjunction with two of the swivel wheels and means are provided whereby the brake may be applied from convenient apparatus located in the transverse manual grip portion 27 of the handle 26. For this purpose there is arranged in the swivel of the bifurcated caster wheel support 100 a concentric vertically reciprocable pin 102 having an arcuate wheel engaging surface 104 and which pin is normally held in a lifted position through the return spring 106 acting between a shoulder 108 in the frame 16 and a nut 110 on the upper end of the pin 102. To engage the arcuate wheel engaging surface 104 with the rim of the caster wheel 17 a bell crank lever 112 is provided with an adjustable arm 114 adapted to bear upon the top end of the pin 102. Actuation of the bell crank lever 112 is accomplished by means of a Bowden cable and conduit control 116, the other end of the cable being attached to hand levers 118 and 118' pivoted at 120 and 120' in the transverse grip portion 27 of the handle 26 (see Figure 4). It will appear that by manipulating either handle 118 or 118', either the right or left-hand wheel brake 104 may be applied, and in order to maintain the brake in applied condition, a spring urged ratchet pawl 122 and 122' is provided in connection with each lever 118 and 118'.

From the foregoing description, the manner of using the dolly, for example in connection with aircraft, should be clear. For example, if it is desired to move an aircraft around a ship deck or in a hangar, it is necessary to employ two dollies, one for each wheel. Each dolly is prepared to receive a wheel of an airplane by setting the saddle members 28 and 30 into proper position for engaging the tire of the wheel. The saddle members may be arranged so as to automatically assume this position upon releasing the last wheel with which it was in engagement, or may be urged to this position by a light spring or gravity as may be found desirable. Upon engaging the wheel, the saddle will be rotated from the position shown in full in Figure 5 to that shown in dotted in Figure 5 and thereafter lifting of the wheel may take place. For this purpose several upward and downward strokes of the handle 26 will force fluid pressure into the cylinders 46 first causing the latch pin 68 to fix the pivotal position of the saddles 28 and 30 and thereafter to lift the saddles and raise the wheel from the deck or hangar floor. The wheel may be raised to any desired height by subsequent reciprocation of the handle 26 and thereafter the check valves 91 and 93 associated with the pump will operate to maintain the fluid pressure within the cylinders 46. After a dolly is engaged with each wheel of the aircraft, the aircraft may be swung around in any desired manner by a single operator through manual movement of one of the dollies, the caster wheels being of sufficient diameter and sufficiently easily swung upon the caster pivots as to afford free movement of the dolly as may be desired. After the aircraft is positioned in any desired location, the wheel tread engaging brakes 104 may be forced into engagement with the wheel tread through operation of the levers 118 and 118' on the handle grip 72 and the brake latched in engaged position through the latch pawls 122 and 122'. When it is desired to move the aircraft subsequently the latch pawls 122 may be released, the plane readily moved about upon the freely moving dolly, and when in proper position the three-way valve 94 may be actuated to release the fluid within the cylinders 46 and permit the same to flow into the reservoir 88.

There is thus provided a dolly adapted to grip a wheel and elevate the same without any necessity for engagement with any portion of the wheel other than the actual tire thereupon. In addition, the elevating action as well as the moving of the dolly into position to grip the wheel are remote-controlled from a handle positioned well away from the wheel itself so that an aircraft attendant may use the dolly without considerable discomfort. The arrangement is such as to afford considerable size to the wheels of the dolly so that the same may be readily maneuvered by man power alone, and provision is made for quickly locking the dolly in any particular position at which it may be found desirable to leave the same. In addition, the wheel engaging members are adapted, because of their peculiar shape, to engage and embrace automatically tires of many varying sizes so that a particular set of dollies would be found sufficient to take care of varying sizes of aircraft without any particular adjustment or change other than that which is automatically taken care of by the wheel saddle positioning lock described.

Although a single embodiment or modification of the invention has been illustrated and described, it is to be understood that the invention is not limited thereto but may be embodied in various alternative mechanical forms. As many changes in construction and arrangement of parts may be made without departing from the spirit of the invention as will be well understood by those skilled in the art, reference will be had to the appended claims for a definition of the limits of the invention.

What is claimed is:

1. In an aircraft parking dolly of the character described, in combination, a castered frame, an auxiliary frame hinged to said castered frame, a pair of tire-gripping members pivoted on the auxiliary frame, elevating means connected to the main and auxiliary frames for raising the auxiliary frame, and means for automatically locking the tire-gripping members in operative engagement with a tire of an aircraft, said last means being operative through contact of the tire-gripping members with the tire and upon initial operation of said elevating means.

2. In an aircraft parking dolly of the character described, in combination, a pair of tire-engaging members swivelled to a frame on inclined axes, a pair of elevating means connected to the frame, a castered main frame to which said first-mentioned frame is pivoted, and a single manually operable instrumentality for energizing the elevating means and for moving the dolly into operative engagement with the tire of an aircraft.

3. In an aircraft parking dolly of the character described, in combination, a frame having casters, tire-engaging means hingedly connected to the frame and locking means for automatically locking said means in operative position upon engagement with the tire of an aircraft and the weight thereof, jacking means connected to the frame and to the tire-engaging means, and a single manually controllable means for selectively operating the jacks and the dolly.

4. In a parking dolly of the character described, the combination of a frame, a plurality of casters secured to the frame, tire-engaging members hingedly secured to the frame, elevating means operatively connected to the frame and to the tire-engaging members, means automatically locking the tire-engaging members in operative position to the tire of an aircraft when impinged thereagainst and upon initial operation of said elevating means, and manually operable means hingedly connected to the frame and operatively connected to the elevating means for optionally manipulating the dolly and energizing the said elevating means.

5. In a device of the character described, a substantially U-shaped frame, a plurality of casters for supporting the frame, an auxiliary frame hingedly mounted on the first-mentioned frame, a pair of turnable, tire-engaging members pivotally connected to the auxiliary frame, detent means connected to the tire-engaging members for automatically locking same in operative, tire-engaging position, a pair of jacks connected to the main frame and the auxiliary frame for raising said auxiliary frame when desired including means for initially locking said detent means, and a manually operable member connected to the frame and the jack whereby said jacks can be operated and the frame optionally manipulated.

6. In a device of the character described, supporting means, a pair of wheel tire engaging saddles pivotally supported upon said means and adapted to rock about their pivots to embrace a tire, said pivots being eccentric to the plane of symmetry of said saddles, whereby different degrees of pivotal movement permit said saddles to accommodate different size tires, means to lock said saddles in any one of a plurality of tire embracing positions, and means to elevate said supporting means.

7. In a device of the character described, supporting means, inclined pivotally mounted saddles for engaging and embracing a vehicle wheel for lifting the same, means for lifting said saddles, and means operative by said lifting means to lock said saddles against pivotal movement during lifting.

8. In a device of the character described, a frame, supporting wheels thereon, a lever handle, elevating means on said frame, pivotally mounted saddles for engaging and embracing a vehicle wheel carried on said elevating means, means for actuating said elevating means by movement of said lever handle, and means for locking said saddles against pivotal movement during actuation of said elevating means.

9. In a device of the character described, a frame, supporting wheels thereon, a lever handle, elevating means on said frame, pivotally mounted saddles for engaging and embracing a vehicle wheel carried on said elevating means, means for actuating said elevating means by movement of said lever handle, and means for locking said saddles against pivotal movement during actuation of said elevating means.

10. In a vehicle wheel dolly, a frame, rollers for said frame, means on said frame pivotally adjustable for engaging the underside of various sizes of wheel tires at either side of the contact point of said wheel tire with its supporting surface, means for elevating said engaging means, and means for locking said engaging means in proper adjusted position for a given wheel tire upon operation of said elevating means.

11. In a vehicle wheel dolly, a frame, rollers for said frame, means on said frame pivotally adjustable for engaging the underside of various sizes of wheel tires at either side of the contact point of said wheel tire with its supporting surface, means for elevating said engaging means including a guiding handle lever, oscillatable to effect elevation of said elevating means, and means for locking said engaging means in proper adjusted position for a given wheel tire upon operation of said elevating means.

12. In a vehicle wheel dolly, a frame, rollers for said frame, means on said frame pivotally adjustable for engaging the under-side of various sizes of wheel tires at either side of the contact point of said wheel tire with its supporting surface, means for elevating said engaging means, and means for locking said engaging means in proper adjusted position for a given wheel tire upon operation of said elevating means.

13. In a vehicle parking dolly, a V-frame including divergent arms, caster wheels at the apex and extremities of the arms of the frame, a transverse hollow brace in said frame adjacent the apex and constituting a reservoir for hydraulic fluid, a pair of arms pivotally supported on the arms of said frame near the apex of the frame and adapted to be disposed along the top of the divergent arms, wheel engaging means carried by said pivotally supported arms, hydraulic motors for raising said arms, a pump and conduits for delivering fluid to said motors from said reservoir to elevate said pivotally supported arms, a handle pivotally mounted on said frame, and means for operating said pump through relative movement of said handle to said frame.

14. In a vehicle parking dolly, a V-frame including divergent arms, caster wheels at the apex and extremities of the arms of the frame, a transverse hollow brace in said frame adjacent the apex and constituting a reservoir for hydraulic fluid, a pair of arms pivotally supported on the arms of said frame near the apex of the frame and adapted to be disposed along the top of the divergent arms, wheel engaging means carried by said pivotally supported arms including pivotally mounted saddles for engaging the tire of a wheel, hydraulic motors for raising said arms, a pump and conduits for delivering fluid to said motors from said reservoir to elevate said pivotally supported arms, means for locking said saddles against pivotal movement upon elevating said last-named arms, a handle pivotally mounted on said frame, and means for operating said pump through relative movement of said handle to said frame.

MICHAEL WATTER.